(12) United States Patent
Mukundala et al.

(10) Patent No.: US 12,283,145 B2
(45) Date of Patent: Apr. 22, 2025

(54) METHOD AND AN APPARATUS FOR SWITCHING PREMISES

(71) Applicant: Carrier Corporation, Palm Beach Gardens, FL (US)

(72) Inventors: Sumanth Kumar Mukundala, Telangana (IN); Aswin Sukumaran Nair, Telangana (IN); Nagamalleswara Rao Ravi, Telangana (IN); Bhanu Kiran Kamireddy, Telangana (IN); Rakesh Sirigiripet, Telangana (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/769,141

(22) PCT Filed: Sep. 29, 2020

(86) PCT No.: PCT/IB2020/059077
§ 371 (c)(1),
(2) Date: Apr. 14, 2022

(87) PCT Pub. No.: WO2021/074724
PCT Pub. Date: Apr. 22, 2021

(65) Prior Publication Data
US 2024/0112514 A1  Apr. 4, 2024

(30) Foreign Application Priority Data
Oct. 18, 2019 (IN) .............................. 201911042308

(51) Int. Cl.
*G07C 9/00* (2020.01)
(52) U.S. Cl.
CPC ..... *G07C 9/00904* (2013.01); *G07C 9/00857* (2013.01); *G07C 2009/0088* (2013.01)

(58) Field of Classification Search
CPC ............ G07C 9/00904; G07C 9/00857; G07C 2009/0088; G07C 9/27; H04L 63/105; H04L 63/107; G06Q 10/105
See application file for complete search history.

(56) References Cited

U.S. PATENT DOCUMENTS 7,270,353 B2    9/2007    Sironi et al.
7,336,170 B2    2/2008    Auerbach et al.
(Continued)

FOREIGN PATENT DOCUMENTS

| EP | 3156980 A1 | 4/2017 |
| WO | 2009094683 A1 | 8/2009 |
| WO | 2016089846 A1 | 6/2016 |

OTHER PUBLICATIONS

International Search Report for application PCTIB2020/059077, dated Jan. 18, 2021, 4 pages.
(Continued)

*Primary Examiner* — Vernal U Brown
(74) *Attorney, Agent, or Firm* — CANTOR COLBURN LLP

(57) ABSTRACT

An apparatus and method for switching premises in a convenient way. A method includes transmitting a request to a server for switching a first premises with a second premises. Further, the first premises being accessed using an access card on a first access terminal associated with the first premises. The method further includes receiving access credentials for the second premises from the server in response to the request. The method also includes encoding the access card with the access credentials to access a second access terminal associated with the second premises for permitting entry inside the second premises.

15 Claims, 4 Drawing Sheets

(56) References Cited

U.S. PATENT DOCUMENTS

| | | |
|---|---|---|
| 8,074,271 B2 | 12/2011 | Davis et al. |
| 8,730,004 B2 | 5/2014 | Elfstrom et al. |
| 9,317,018 B2 | 4/2016 | Spodak et al. |
| 9,858,740 B2 | 1/2018 | Borg et al. |
| 11,004,161 B2 | 5/2021 | Nishida |
| 11,238,681 B2 | 2/2022 | Kuenzi |
| 11,257,315 B2 | 2/2022 | Kuenzi |
| 11,315,081 B2 | 4/2022 | Fujimura et al. |
| 11,380,152 B2 | 7/2022 | Kanteti |
| 11,675,979 B2 | 6/2023 | Tsuji |
| 11,790,710 B2 * | 10/2023 | Wishne .............. G07C 9/00571 701/45 |
| 2011/0187493 A1 * | 8/2011 | Elfstrom ............ G07C 9/00309 340/5.6 |
| 2015/0199863 A1 * | 7/2015 | Scoggins ................. G07C 9/28 340/5.25 |
| 2016/0005248 A1 | 1/2016 | Aase |
| 2019/0182260 A1 * | 6/2019 | Patel .................... H04L 63/107 |
| 2019/0309539 A1 | 10/2019 | Mukundala et al. |
| 2024/0135763 A1 | 4/2024 | Mukundala et al. |

OTHER PUBLICATIONS

Written Opinion for application PCT/IB2020/059077, dated Jan. 18, 2021, 4 pages.

International Search Report for application PCT/IB2020/059081, dated Dec. 16, 2020, 4 pages.

Written Opinion for applciation PCT/IB2020/059081, dated Dec. 16, 2020, 4 pages.

\* cited by examiner

METHOD AND AN APPARATUS FOR SWITCHING PREMISES

TECHNICAL FIELD OF INVENTION

The present invention generally relates to access control systems. More particularly, the invention relates to an apparatus and a method for switching premises in a convenient way by using the access control systems.

BACKGROUND OF THE INVENTION

Currently, a user may easily book a premises in a hotel through a hotel website, by using an application in a user device or by making a call at the hotel. Once the premises is booked, the user may be notified with booking information such as date of booking, a time period of stay, type of room, or services opted by the user. When the user reaches the hotel, the user shows his booking information to a hotel staff or at a reception of the hotel and then the hotel staff allocates a premises (for example, a room) as well as a physical access card to the user for accessing the premises. Alternatively, the user may use mobile credentials to access the premises. The access card may be encoded with details for accessing the premises allocated to the user. Once the user enters the premises and finds that the premises is not suitable for one or more reasons, the user needs to ask for a change of the allocated premises. For this, the user needs to either make a call to the hotel staff or at the reception of the hotel or walk all the way down to the reception of the hotel. At the reception, there can be waiting time involved where the hotel staff may not be available at the reception to attend the user or the hotel staff may be busy in catering to other user's requests. On getting the turn, the user requests for a change of premises at the reception. The hotel staff first checks an availability of a new premises and then, can allocate a premises by encoding a separate access card for a new allocated premises. Also, the hotel staff cancels the previously allocated premises. This consumes a lot of time of the user as well the of hotel staff. Moreover, such a process is manually intensive for the user and the waiting time involved can be agonizing for the user. Such an activity of changing a premises is frequent in hotels. In view of the afore-mentioned problems in the existing solutions, there is a need of an efficient and effective system and a method for providing a solution to reduce waiting time of a user for changing a premises. There is also a need to eliminate manual task involved for a user while changing a premises. There is also a requirement for providing an easy solution for encoding an access card. In order to solve the problems in the existing solutions, an apparatus and a method are disclosed.

SUMMARY OF THE INVENTION

Various embodiments of the invention describe a method for switching a first premises with a second premises in a convenient way. The method comprises steps of transmitting a request to a server for switching a first premises with a second premises. The first premises is accessed using an access card on a first access terminal associated with the first premises. The method further comprises steps of receiving access credentials for the second premises from the server in response to the request. The method also comprises steps of encoding the access card with the access credentials to access a second access terminal associated with the second premises for permitting entry inside the second premises.

In another embodiment of the invention, the request for switching the first premises with the second premises is transmitted using an application stored in a user device.

In a different embodiment of the invention, the access credentials are received by an application stored in a user device through a cellular communication channel or a Wi-Fi communication channel.

In an embodiment of the invention, the user device encodes the access card with the access credentials by establishing a first communication channel between the user device and the access card. Further, the first communication channel corresponds to a near-field communication channel.

In another embodiment of the invention, the user device transmits the access credentials to the first access terminal by establishing a second communication channel between the user device and the first access terminal. Further, the second communication channel corresponds to a bluetooth communication channel.

In yet another embodiment of the invention, the first access terminal encodes the access card with the access credentials for the second premises.

In another embodiment of the invention, the user device receives a message from the server for cancellation of a reservation of the first premises and a confirmation for reservation of the second premises when the second premises is available.

In still another embodiment of the invention, the server determines the second premises from a list of unreserved premises available for a time period for which the first premises is reserved.

In a different embodiment of the invention, the server transmits the access credentials generated for the second premises to a front desk system.

Various embodiments of the invention describe a user device for switching a first premises with a second premises in a convenient way. The user device comprises a transmitter adapted to transmit a request to a server for switching a first premises with a second premises. Also, the first premises is accessed using an access card on a first access terminal associated with the first premises. The user device also comprises a receiver adapted to receive access credentials for the second premises from the server in response to the request. The user device further comprises an encoding unit adapted to encode the access card with the access credentials to access a second access terminal associated with the second premises for permitting entry inside the second premises.

In another embodiment of the invention, the request for switching the first premises with the second premises is transmitted using an application stored in a user device.

In a different embodiment of the invention, the access credentials are received by an application stored in a user device through a cellular communication channel or a Wi-Fi communication channel.

In an embodiment of the invention, the user device encodes the access card with the access credentials by establishing a first communication channel between the user device and the access card. Further, the first communication channel corresponds to a near-field communication channel.

In another embodiment of the invention, the user device transmits the access credentials for the second premises to the first access terminal by establishing a second communication channel between the user device and the first access terminal. Further, the second communication channel corresponds to a bluetooth communication channel.

In yet another embodiment of the invention, the first access terminal encodes the access card with the access credentials for the second premises.

In a different embodiment of the invention, a computer readable medium is disclosed for switching a first premises with a second premises in a convenient way. The computer readable medium comprises one or more processors and a memory coupled to the one or more processors, the memory stores instructions executed by the one or more processors. The instructions are executed by the one or more processors which are configured to transmit a request to a server for switching a first premises with a second premises. The first premises is accessed using an access card on a first access terminal associated with the first premises. The instructions are further executed by the one or more processors and the one or more processors are further configured to receive access credentials for the second premises from the server in response to the request. The one or more processors are also configured to encode the access card with the access credentials to access a second access terminal associated with the second premises for permitting entry inside the second premises.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1A:
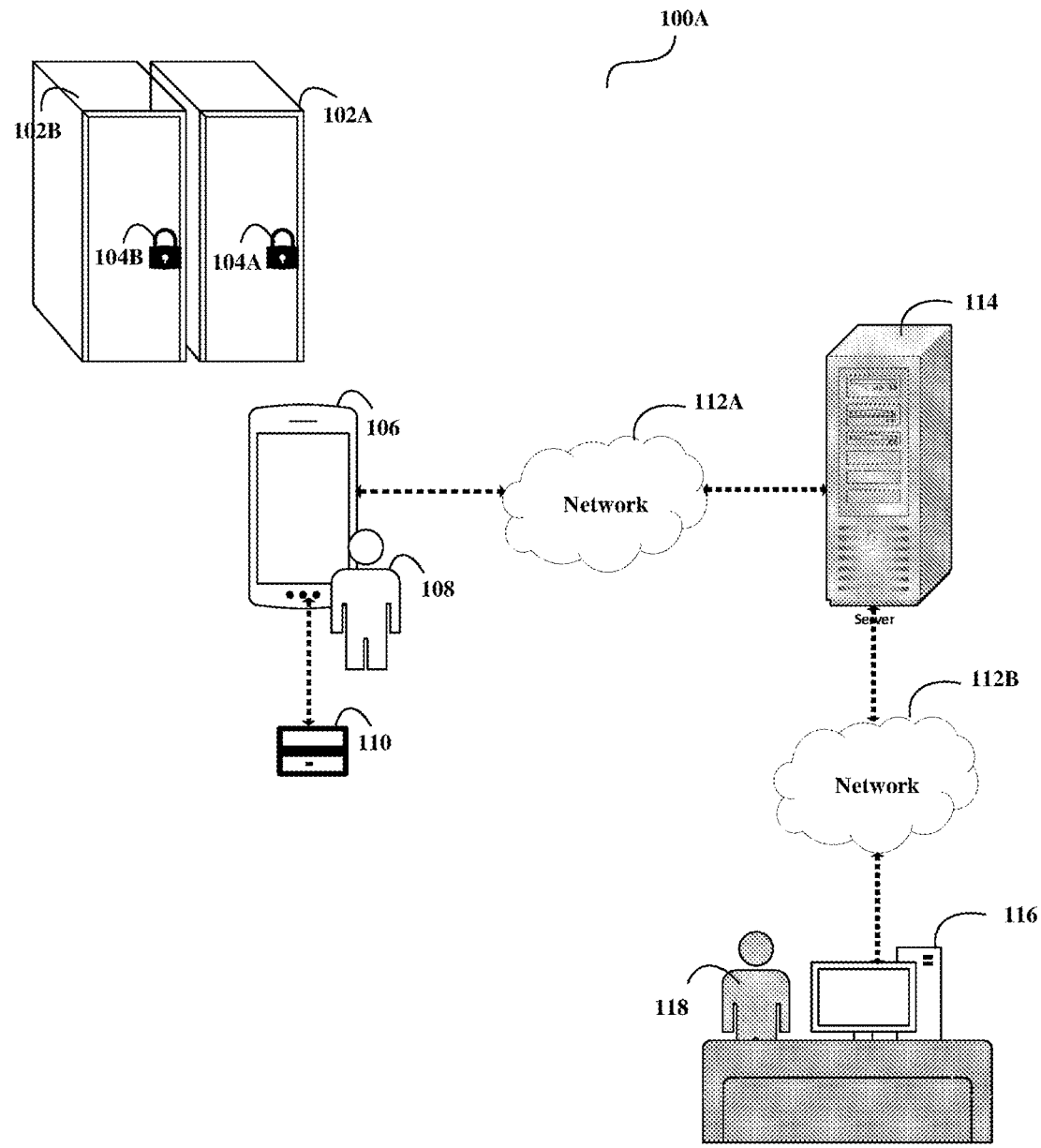
FIG. 1A depicts an exemplary system architecture according to an exemplary first embodiment of the invention.

Described herein is the technology with an apparatus and a method for switching a first premises with a second premises in a convenient way. The first premises may be reserved by a user (such as, a guest) for a specific time period. The user may access the first premises using an access card on a first access terminal associated with the first premises. When the user enters the first premises and do not like the first premises, the user may request for switching the first premises with any other premises, for example a second premises. Further, the user may an authorized user who already has booked the first premises which has not been cancelled and now the user wants to switch the first premises with any other premises. By using the present invention for switching the first premises with any other premises, the user need not approach or make a call to a hotel staff or at a reception. Such a request may be raised by the user through an application stored in a user device of the user. The application using the user device may transmit the request for switching the first premises with the second premises to a server through a network. The server may determine a second premises and may generate access credentials for the second premises. The server may transmit the access credentials for the second premises to the user device through a network.

In an exemplary embodiment, the user device may encode the access card with the access credentials to access a second access terminal associated with the second premises for permitting entry inside the second premises. In an exemplary alternative embodiment, the user device may transmit the access credentials to the first access terminal to encode the access card with the access credentials to access the second access terminal associated with the second premises.

As used herein, the first access terminal may be installed on the first premises and the second access terminal may be installed on the second premises. The first access terminal or the second access terminal may comprise, but is not limited to, a transmitter, a receiver, a bluetooth unit, a near-field communication unit, a bluetooth unit, an encoding unit, a keypad, an interface, a processor, a memory, and the like. The accessing device may be a lock, a smart lock, an electro-mechanical lock or any such device as understood by a person skilled in the art. Also, the premises can be a building, a room with a door or a floor where the accessing device can be installed.

As used herein, the user device is associated with the user and may store one or more applications. The user device may be a desktop computer or a hand held device such as a mobile phone with network connectivity. Example of the user device includes a desktop, workstation PC, a laptop, a smart phone, a tablet, a wearable device and the like.

As used herein, the application may be stored in the user device. The application may be associated with a hotel, building and the like comprising the premises. The application may be installed on a user device. The application is able to interact with a server/cloud associated with the premises. The application may include the details of the user regarding the period of stay, access details, premises type, privileges associated with the premises. The application may also provide a user interface to communicate with the hotel staff at a front desk and the like. Such an application may be provided by a manufacturer/developer of the first access terminal or the second access terminal, a service-provider of a premises, an owner of a premises or any other such application associated directly or indirectly with the first access terminal, the second access terminal or the premises.

As used herein, the server has processing capabilities as disclosed further in the specification. The server may be a cloud storage, a remote database, or any such storage known in the art.

As used herein, the network may refer to a mesh network, Global System for Mobile (GSM) network, a Long-Term Evolution (LTE) network, a code-division multiple access (CDMA) network, a narrow-band internet of thing (NB-IoT) technique or category M1 technique, a bluetooth network, a WiFi network, a ZigBee network or any such network/technique that is known in the art.

FIG. 1A depicts a system architecture 100A for switching a first premises with a second premises, according to an exemplary first embodiment of the invention. As depicted in FIG. 1A, a user 108 may be associated with a user device 106. The user 108 may reserve a first premises 102A (or a room of a hotel) through an application stored in the user device 106 or through a website. The user 108 may reserve the first premises 102A for a specific time period. For an instance, the user 108 may reserve the first premises 102A for a period of Oct. 5, 2019 to Oct. 7, 2019. The user device 106 may establish a cellular communication channel or a Wi-Fi communication channel over a network 112A with a server 114 and may transmit a reservation request for the first premises 102A to the server 114 through the cellular communication channel or the Wi-Fi communication channel. The server 114 may confirm the reservation of the first premises 102A for the specific time period to the user device 106.

When the user 108 reaches to the hotel for check-in at the desired period stated above, a staff personnel 118 at a front desk may encode an access card 110 with first access credentials using a front desk system 116 for accessing the first premises 102A and may issue the encoded access card 110 to the user 108. The user 108 may reach the first premises 102A allocated to the user 108 and may use the encoded access card 110 to access the first premises 102A on the first access terminal 104A associated with the first premises 102A. Using the access card 110 on the first access terminal 104A may allow the user 108 to permit entry inside the first premises 102A. On entering inside the first premises 102A, the user 108 may not like the first premises 102A and may wish to switch the first premises 102A with a second premises 102B. For this, the user 108 may open the application stored in the user device 106 and may select an option provided in the application to raise a request for switching the first premises 102A with the second premises 102B. Once the user 108 selects the option in the application for switching the first premises 102A with the second premises 102B, the user device 106 using the application may transmit a request to the server 114 for switching the first premises 102A with the second premises 102B. Such a request may be transmitted by establishing a cellular communication channel or a Wi-Fi communication channel of a network 112A between the user device 106 and the server 114.

On receiving the request from the user device 106, the server 114 may determine the second premises 102B for switching the first premises 102A with the second premises 102B. For this, the server 114 may determine and choose the second premises 102B from a list of unreserved premises in the hotel which are not reserved by any user during the time period and can be allocated to the user 108. Further, while determining the second premises 102B, the server 114 may also determine an availability of the second premises 102B for the period during which the first premises 102A is reserved by the user 108. For an instance, the server 114 determines the second premises 102B for the period of Oct. 5, 2019 to Oct. 7, 2019. After the server 114 determines the second premises 102B, then the server 114 may generate second access credentials for the second premises 102B and may transmit details of the second premises 102B as well as the second access credentials for the second premises 102B to the application in the user device 106 through a cellular communication channel or a Wi-Fi communication channel of the network 112A.

Moreover, once the server 114 determines that the second premises 102B is available for switching, the server 114 may also transmit a message to the user device 106 informing the cancellation of the reservation of the first premises 102A and a confirmation of reservation of the second premises 102B. As used herein, the details of the second premises 102B may comprise, but is not limited to, an identifier/number of the second premises 102B, a floor number where the second premises 102B is located, additional cost incurred for switching the first premises 102A with the second premises 102B, and/or a specific time period for which the second premises 102B is allocated to the user 108. As used herein, the second access credentials may comprise a unique code for accessing the second premises 102B.

In case the server 114 does not determine any second premises or find that no such second premises 102B is available from a list of premises in the hotel for switching with the first premises 102A, the server 114 may transmit a notification to the user device 106 regarding unavailability of the second premises 102B. Furthermore, the server 114 may not find any second premises which are not reserved by any user for the specific time period for which the first premises 102A has been reserved by the user 108. For an instance, the server 114 may determine that there is no second premises 102B available for Oct. 5, 2019 to Oct. 7, 2019. In such a case, the server 114 may suggest any second premises to the user 108 available for an intermediate date/day in between the time period as mentioned by the user 108. For an example, the server 114 may suggest to the user 108 that the second premises 102B is available only for the time period of Oct. 6, 2019 to Oct. 7, 2019 and not for the time period of Oct. 5, 2019 to Oct. 7, 2019 as desired by the user 108.

Further as depicted in FIG. 1A, the user device 106 may establish a first communication channel between the user device 106 and the access card 110. In an exemplary embodiment, the first communication channel may correspond to a near-field communication (NFC) channel. When the application in the user device 106 receives the second access credentials for the second premises 102B, the user device 106 may encode the access card 110 with the second access credentials for the second premises 102B through the first communication channel. The encoding of the access card 110 with the second access credentials may be done by transmitting the second access credentials from the user device 106 to the access card 110 through the first communication channel. Furthermore, the encoding of the access card 110 may also involve replacing the first access credentials for the first premises 102A with the second access credentials for the second premises 102B in the access card 110. In other words, the first access credentials for the first premises 102A may be removed from the access card 110.

The encoded access card 110 with the second access credentials may be used to access a second access terminal 104B associated with the second premises 102B for permitting entry inside the second premises 102B and thereby, the user 108 may access the second premises 102B. In an exemplary embodiment, the access card 110 may be a radio-frequency identification (RFID) card. In another exemplary embodiment, the access card 110 may be a smart card with a micro-chip embedded in the access card 110. In yet another exemplary embodiment, the access card 110 may be an access card with a near-field communication technology.

The present invention also facilitates the server 114 to transmit the details of the second premises 102B and the second access credentials for the second premises 102B to the front desk system 116 through a network 112B. Thereby, the front desk system 116 and the staff personnel 118 may be informed regarding the second access credentials and the switching of the first premises 102A with the second premises 102B for the user 108. As used herein, the front desk system 116 may be a system used by the hotel staff personnel 118 to allocate premises and issue encoded access card 110 to the user 108 for accessing the premises.

Figure 1B:
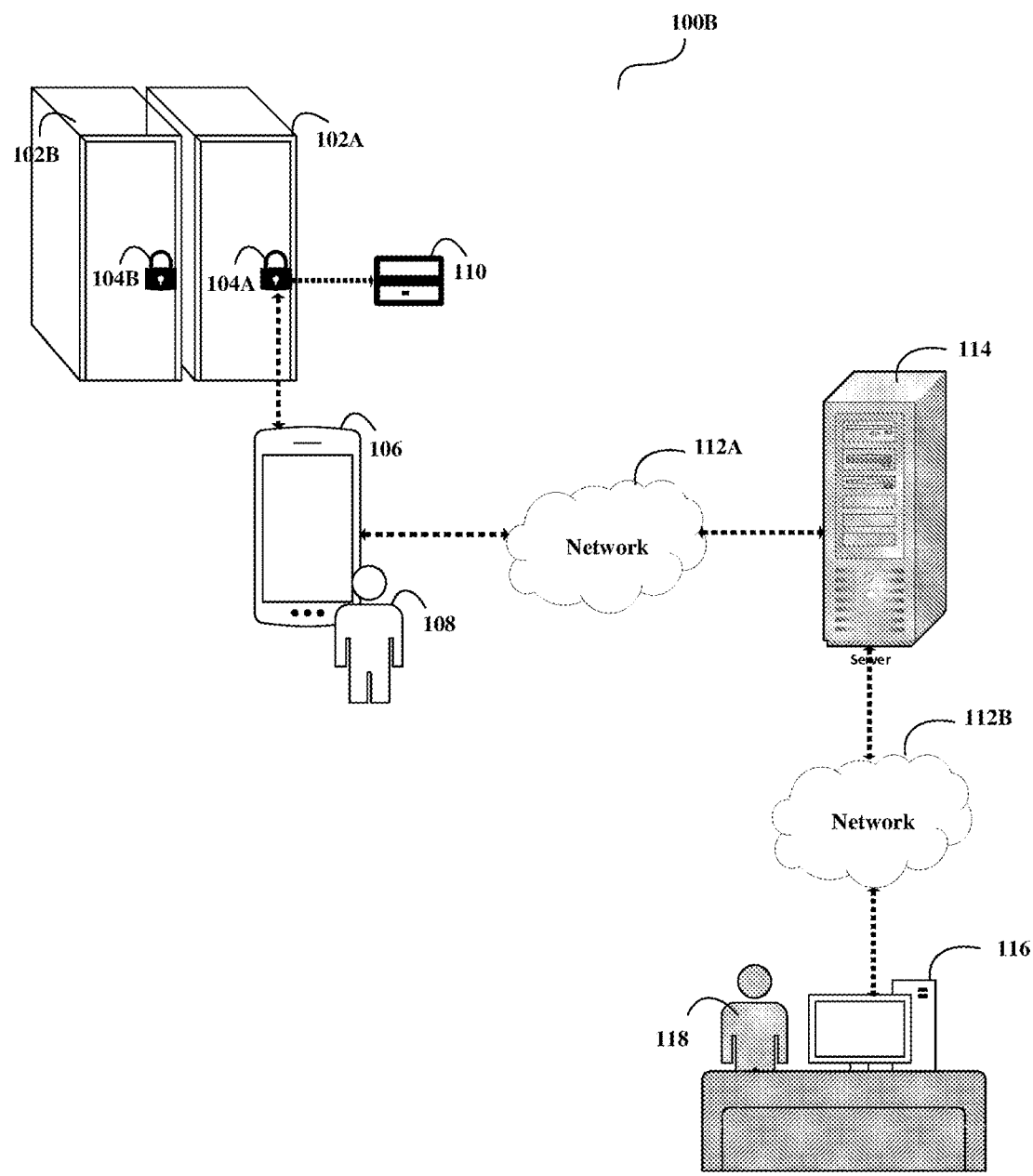
FIG. 1B depicts an exemplary system architecture according to an exemplary second embodiment of the invention.

FIG. 1B depicts a system architecture 100B for switching a first premises with a second premises, according to an exemplary second embodiment of the present invention. In the exemplary second embodiment of the invention, the procedure for transmitting a reservation request for a first premises 102A to a server 114 transmitting a request to the server 114 for switching the first premises 102A with a second premises 102B, determining the second premises 102B by the server 114, transmitting a message to a user device 106 for cancellation of the reservation of the first premises 102A and transmitting a confirmation for reservation of the second premises 102B to the user device 106 remain same as described above in FIG. 1A with respect to exemplary first embodiment of the invention. The exemplary second embodiment of the invention describes an alternative for encoding the access card 110 with the second access credentials to access a second access terminal 104B associated with the second premises 102B.

In the exemplary second embodiment of the invention and as depicted in FIG. 1B, the user device 106 may establish a second communication channel between the user device 106 and the first access terminal 104. In an exemplary embodiment, the second communication channel may correspond to a bluetooth communication channel. When the application in the user device 106 receives the second access credentials for the second premises 102B from the server 114, the user device 106 may transmit the second access credentials to the first access terminal 104 through the second communication channel.

On receiving the second access credentials for the second premises 102B, the first access terminal 104 may establish a near-field communication (NFC) channel between the first access terminal 104 and the access card 110. Then, the first access terminal 104 may encode the access card 110 with the second access credentials for the second premises 102B through the near-field communication (NFC) channel. In an exemplary embodiment, the encoding of the access card 110 with the second access credentials may be done by transmitting the second access credentials from the first access terminal 104 to the access card 110 through the near-field communication (NFC) channel. In an exemplary alternative embodiment, the encoding of the access card 110 with the second access credentials may be done by inserting the access card 110 in a slot of the first access terminal 104. Furthermore, the encoding of the access card 110 may also involve replacing the first access credentials for the first premises 102A with the second access credentials for the second premises 102B in the access card 110. The encoded access card 110 with the second access credentials may be used to access a second access terminal 104B associated with the second premises 102B for permitting entry inside the second premises 102B.

Figure 2:
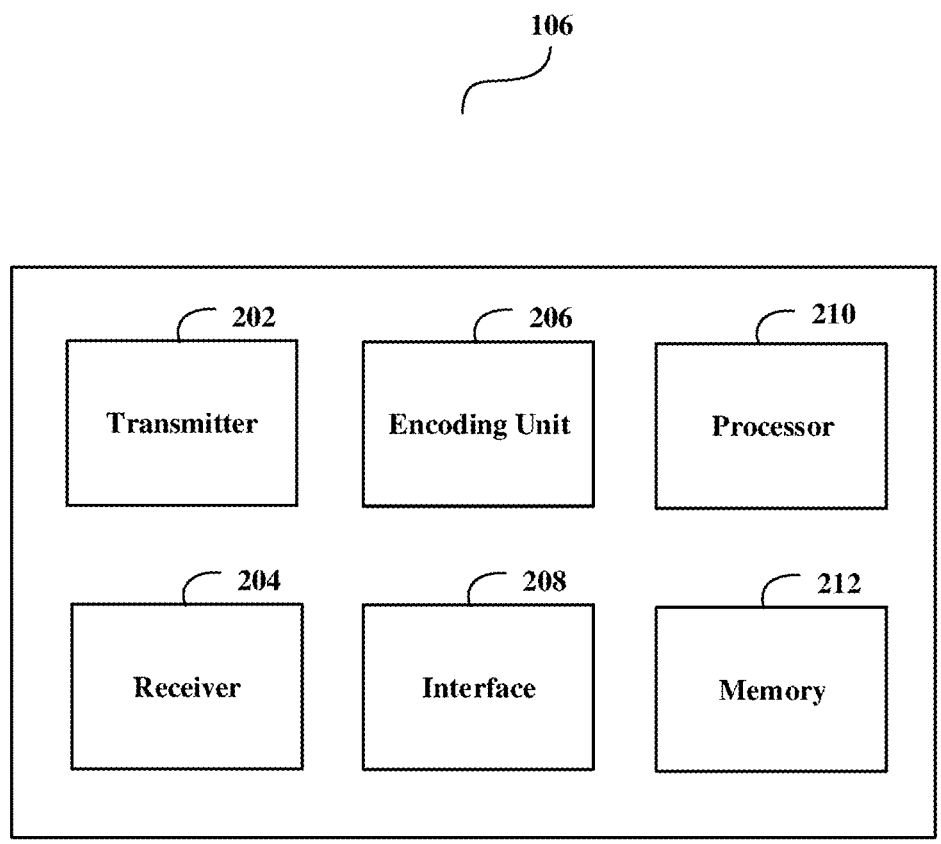
FIG. 2 depicts block diagram of different components of a user device according to an exemplary embodiment of the invention.

FIG. 2 depicts a block diagram of different components of a user device 106 according to an exemplary embodiment of the invention. The user device 106 may comprise, but is not limited to, a transmitter 202, a receiver 204, an encoding unit 206, an interface 208, a processor 210, a memory 212, and the like. The interface 208 of the user device 106 may be adapted to display an application at the user device 106 and may further be adapted to provide an option to a user for selecting the option in the application for switching a first premises 102A with a second premises 102B. The transmitter 202 of the user device 106 may be adapted to transmit a request to a server 114 over a network 112A for switching the first premises 102A with the second premises 102B. The receiver 204 of the user device 106 may be adapted to receive a message from the server 114 for cancellation of the reservation of the first premises 102A and to receive a confirmation for reservation of the second premises 102B. The receiver 204 may also be adapted to receive a details of the second premises 102B and second access credentials generated for the second premises 102B from the server 114. The encoding unit 206 of the user device 106 may be adapted to encode an access card 110 with the second access credentials for the second premises 102B through a first communication channel as discussed above in FIG. 1A. The memory 212 of the user device 106 may be adapted to store the details of the second premises 102B and the second access credentials for accessing the second premises 102B.

As explained in FIG. 1B above, the transmitter 202 of the user device 106 may further be adapted to transmit the details of the second premises 102B and the second access credentials to a first access terminal 104A associated with the first premises 102A through a second communication channel. On receiving the details of the second premises 102B and the second access credentials, the first access terminal 104A may be adapted to encode the access card 110 with the second access credentials for the second premises 102B through a near-field communication (NFC) channel as discussed above in FIG. 1B. For this, an encoding unit (same as that of the encoding unit 206 of the user device 106) may be residing in the first access terminal 104A to encode the access card 110 with the second access credentials in a same manner as by the encoding unit 206 of the user device 106.

Moreover, the transmitter 202, the receiver 204, the encoding unit 206, the interface 208, and/or the memory 212 may be communicably coupled with the processor 210. The different units described herein are exemplary. The invention may be performed using one or more units. For example, the tasks executed by the transmitter 202, the receiver 204, the encoding unit 206, the interface 208, the memory 212 and/or the processor 210 may be performed by a single unit. Alternatively, more number of units as described herein may be used to perform the present invention.

Figure 3:
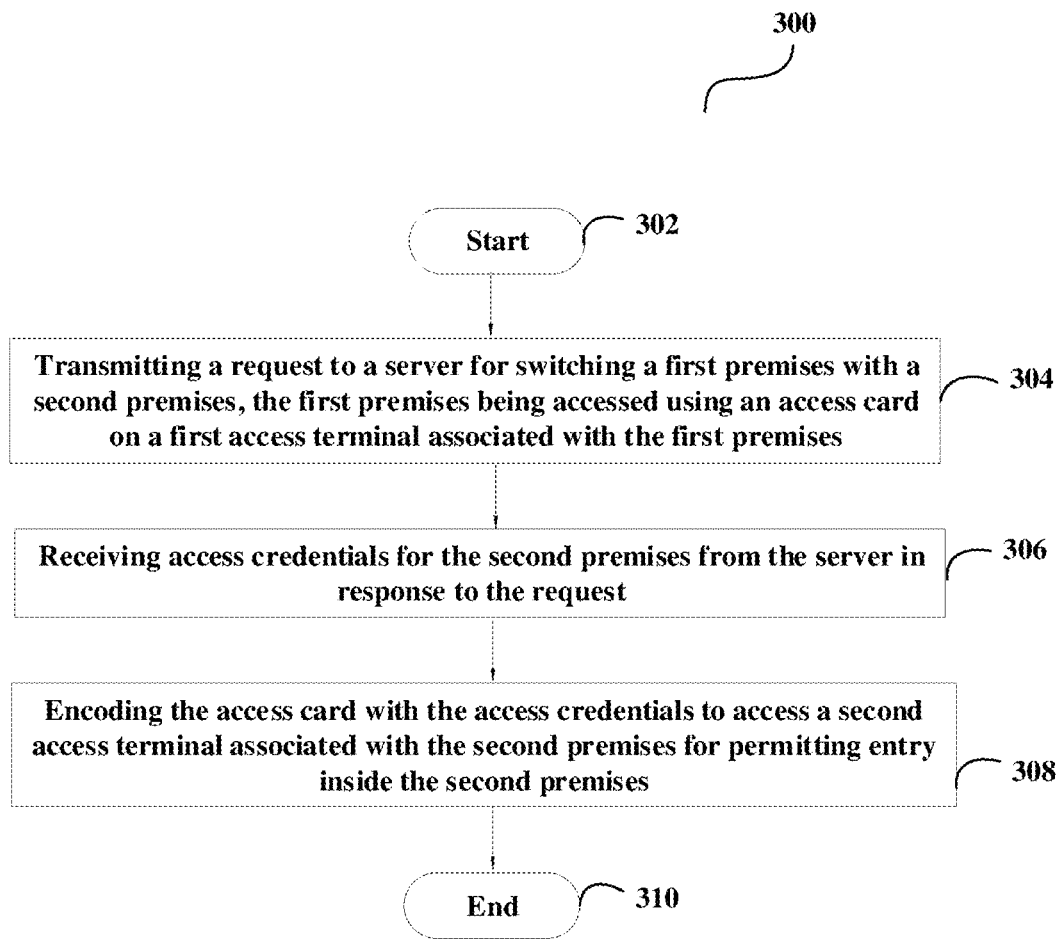
FIG. 3 depicts an exemplary flowchart illustrating a method to perform the invention according to an exemplary embodiment of the invention.

FIG. 3 depicts a flowchart outlining the features of the invention in an exemplary embodiment of the invention. The method flowchart 300 describes a method being for switching a first premises 102A with a second premises 102B. The method flowchart 300 starts at step 302.

At step 304, the user device 106 using an application may transmit a request to a server 114 for switching a first premises 102A with a second premises 102B. Such a request may be transmitted by establishing a cellular communication channel or a Wi-Fi communication channel of a network 112A between the user device 106 and the server 114.

At step 306, the user device 106 using the application may receive details of the second premises 102B as well as second access credentials for the second premises 102B from the server 114 through a cellular communication channel or a Wi-Fi communication channel of the network 112A.

At step 308, the user device 106 using the application may encode an access card 110 with the second access credentials for the second premises 102B through a first communication channel. In an exemplary embodiment, the first communication channel may correspond to a near-field communication (NFC) channel. The encoding of the access card 110 with the second access credentials may be done by transmitting the second access credentials from the user device 106 to the access card 110 through the first communication channel. Furthermore, the encoding of the access card 110 may also involve replacing a first access credentials for the first premises 102A with the second access credentials for the second premises 102B in the access card 110. In other words, the first access credentials for the first premises 102A may be removed from the access card 110. The encoded access card 110 with the second access credentials may be used to access a second access terminal 104B associated with the second premises 102B for permitting entry inside the second premises 102B and thereby, the user 108 may access the second premises 102B. Then, the method flowchart 300 may end at 310.

The present invention is applicable in various industries/fields such as, but not limited to, hospitality industry, housing industry, building/construction industry, offices, hospitals, and any such industry/field that is well known in the art and where the access terminals are used.

The present invention provides the following technical advantages over the existing solutions a) facilitates a user to switch/change premises in an easy and convenient way, b) eliminates the need to approach front-desk system or a reception to switch/change premises, c) eliminates time and efforts required to be invested by a user to switch/change premises, d) provides an easy way for encoding an access card for accessing a new premises, e) easily implements the proposed invention to all kinds of the access terminal (online or offline access terminals), and f) minimizes crowd at front-desk system or a reception.

The embodiments of the invention and the tables discussed herein are exemplary and various modification and alterations to a person skilled in the art are within the scope of the invention.

In one embodiment of the invention, the invention can be operated using the one or more computer readable devices. The one or more computer readable devices can be associated with a user device 106. A computer readable medium comprises one or more processors and a memory coupled to the one or more processors, the memory stores instructions executed by the one or more processors, the one or more processors configured to transmit a request to a server 114 for switching a first premises 102A with a second premises 102B. Also, the first premises 102A being accessed using an access card 110 on a first access terminal 104A associated with the first premises 102A. The memory stores instructions executed by the one or more processors, the one or more processors configured to receive access credentials for the second premises 102B from the server 114 in response to the request. The memory stores instructions executed by the one or more processors, the one or more processors also configured to encode the access card 110 with the access credentials to access a second access terminal 104B associated with the second premises 102B for permitting entry inside the second premises 102B.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

We claim:

1. A method comprising:
   transmitting a request to a server for switching a first premises with a second premises, the first premises is accessed using an access card encoded with access credentials for accessing a first access terminal associated with the first premises, the first premises being a hotel room under reservation for a user;
   receiving access credentials for the second premises from the server in response to the request; and
   encoding the access card by replacing the access credentials for accessing the first access terminal with the access credentials to access a second access terminal associated with the second premises for permitting entry inside the second premises;
   wherein the access credentials to access the second access terminal are received by an application stored in a user mobile device through a cellular communication channel or a Wi-Fi communication channel;
   wherein the user mobile device encodes the access card with the access credentials to access the second access terminal by establishing a first communication channel between the user device and the access card;
   wherein the user mobile device receives a message from the server for cancellation of the reservation of the first premises and a confirmation for reservation of the second premises when the second premises is available;
   wherein the server determines the second premises from a list of unreserved hotel rooms available for a time period for which the first premises is reserved under the reservation.

2. The method of claim 1, wherein the request for switching the first premises with the second premises is transmitted using an application stored in a user mobile device.

3. The method of claim 1, wherein the first communication channel corresponds to a near-field communication channel.

4. The method of claim 1, wherein the user mobile device transmits the access credentials to the first access terminal by establishing a second communication channel between the user device and the first access terminal.

5. The method of claim 4, wherein the first access terminal encodes the access card with the access credentials for the second premises.

6. The method of claim 4, wherein the second communication channel corresponds to a bluetooth communication channel.

7. The method of claim 1, wherein the server transmits the access credentials generated for the second premises to a front desk system.

8. A user mobile device comprising:
   a transmitter adapted to transmit a request to a server for switching a first premises with a second premises, the first premises is accessed using an access card encoded with access credentials for accessing a first access terminal associated with the first premises, the first premises being a hotel room under reservation for a user;
   a receiver adapted to receive access credentials for accessing a second access terminal at the second premises from the server in response to the request; and
   an encoding unit adapted to encode the access card by replacing the access credentials for accessing the first access terminal with the access credentials to access the second access terminal associated with the second premises for permitting entry inside the second premises;
   wherein the user mobile device encodes the access card with the access credentials to access the second access terminal by establishing a first communication channel between the user mobile device and the access card;
   wherein the user mobile device receives a message from the server for cancellation of the reservation of the first premises and a confirmation for reservation of the second premises when the second premises is available;
   wherein the server determines the second premises from a list of unreserved hotel rooms available for a time period for which the first premises is reserved under the reservation.

9. The user mobile device of claim 8, wherein the request for switching the first premises with the second premises is transmitted using an application stored in the user mobile device.

10. The user mobile device of claim 8, wherein the access credentials to access the second access terminal are received by an application stored in the user mobile device through a cellular communication channel or a Wi-Fi communication channel.

11. The user mobile device of claim 8, wherein the first communication channel corresponds to a near-field communication channel.

12. The user device of claim 8, wherein the user mobile device transmits the access credentials for the second premises to the first access terminal by establishing a second communication channel between the user device and the first access terminal.

13. The user mobile device of claim 12, wherein the second communication channel corresponds to a bluetooth communication channel.

14. The user mobile device of claim 8, wherein the first access terminal encodes the access card with the access credentials for the second premises.

15. A computer readable medium comprising one or more processors and a memory coupled to the one or more processors, the memory storing instructions executed by the one or more processors, the one or more processors configured to:

transmit a request to a server for switching a first premises with a second premises, the first premises is accessed using an access card encoded with access credentials for accessing a first access terminal associated with the first premises, the first premises being a hotel room under reservation for a user;

receive access credentials for the second premises from the server in response to the request; and encode the access card by replacing the access credentials for accessing the first access terminal with the access credentials to access a second access terminal associated with the second premises for permitting entry inside the second premises;

wherein the access credentials to access the second access terminal are received by an application stored in a user mobile device through a cellular communication channel or a Wi-Fi communication channel;

wherein the user mobile device encodes the access card with the access credentials to access the second access terminal by establishing a first communication channel between the user device and the access card;

wherein the user mobile device receives a message from the server for cancellation of the reservation of the first premises and a confirmation for reservation of the second premises when the second premises is available;

wherein the server determines the second premises from a list of unreserved hotel rooms available for a time period for which the first premises is reserved under the reservation.

\* \* \* \* \*